May 10, 1960

LE GRAND H. LULL 2,936,001

CONTROL VALVE

Filed May 29, 1957

INVENTOR.
LE GRAND H. LULL
BY
*Carlsen & Hogle*
ATTORNEYS

May 10, 1960

LE GRAND H. LULL 2,936,001

CONTROL VALVE

Filed May 29, 1957

INVENTOR.
LE GRAND H. LULL
BY
Carlsen & Hoyle
ATTORNEYS

United States Patent Office 2,936,001
Patented May 10, 1960

2,936,001

CONTROL VALVE

Le Grand H. Lull, Minneapolis, Minn.

Application May 29, 1957, Serial No. 662,483

5 Claims. (Cl. 137—622)

My invention relates generally to improvements in valves for controlling the flow of a fluid and the primary object is to provide a valve which may be readily made up in a bank or a multiple valve assembly for the control of any desired number of separate fluid paths or circuits.

Another object is to provide a valve of this general character which is simple and inexpensive in construction, positive in operation and which will permit the "finger tip" control of the required number of fluid circuits.

My invention is particularly suited to use with a vacuum system for controlling positive pressure fluid circuits, the control valve being so set up that no seals or packings are required and consisting of a plurality of valve plungers which normally vent the controlled elements to atmosphere but which are movable by control levers to connect the controlled elements to the vacuum source as required.

These and other more detailed and specific objects will be disclosed in the course of the following specification, reference being had to the accompanying drawings, in which—

Figure 1:
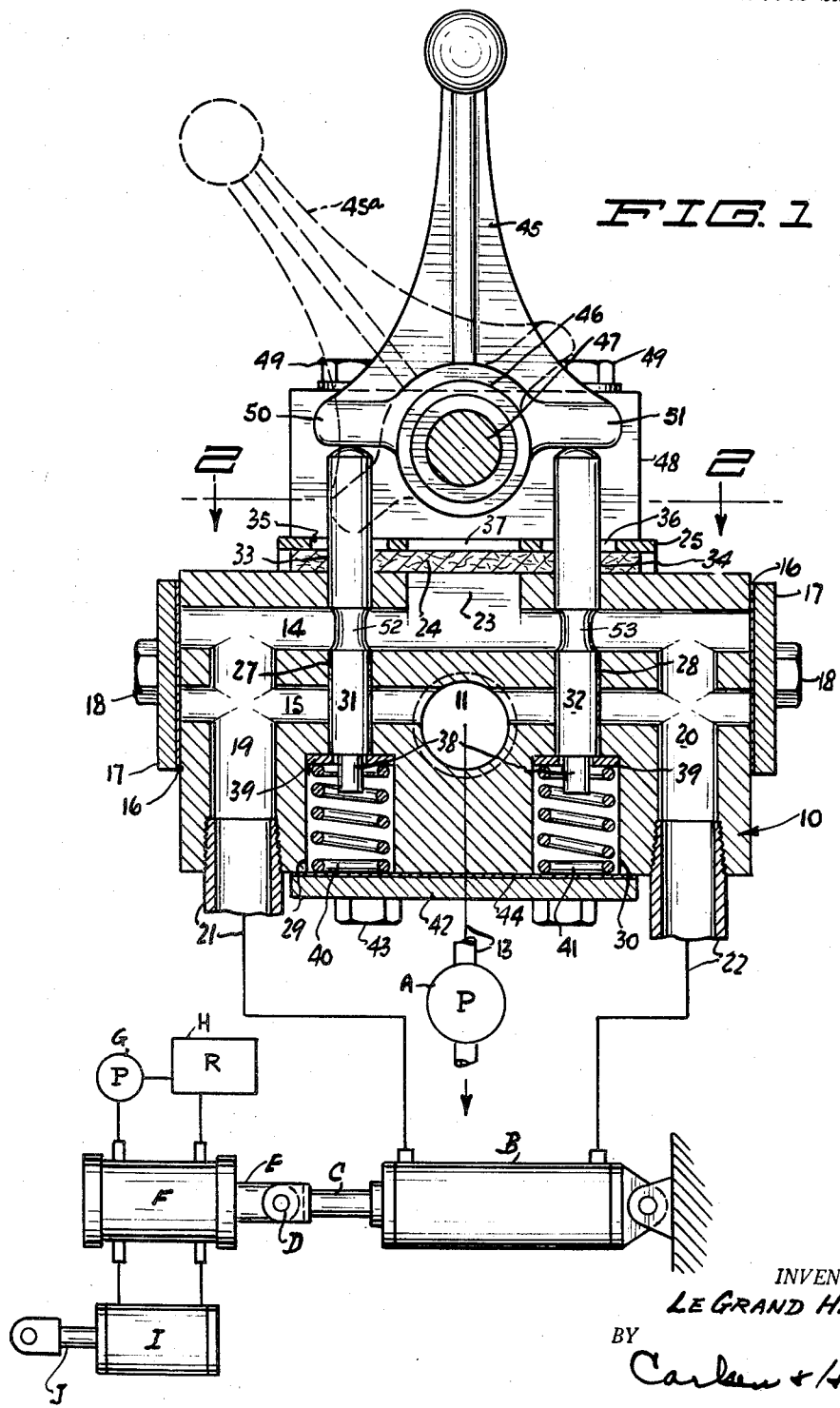
Fig. 1 is a cross sectional view of the control valve of my invention, indicating in schematic form the connection thereof to a positive pressure fluid circuit including a control cylinder, a valve, a controlled cylinder and associated pressure source and reservoir.

In the description of my invention which follows, in which reference is had to the accompanying drawings, I shall describe my control valve as used in association with a vacuum or negative pressure source A (Fig. 1) for the actuation of a control cylinder B having a reciprocating piston rod C which is connected at D to the control valve piston E of a valve F which selectively connects a positive pressure source such as a pump G, or a reservoir H, to the opposite ends of a controlled cylinder or ram I, having a reciprocating piston rod J. While I do not limit the application of my invention to precisely such a system it will find wide adaptability to the control of the numerous hydraulic rams which are used to control and position the various working parts of road maintaining equipment (not shown) such as graders and the like, and by the utilization of a simple vacuum source "finger tip" remote control of a considerable number of such rams is readily accomplished.

My control valve comprises a valve block or body member 10 of any suitable shape, here shown as a rectangular and rectilinear casting through which extends from end to end an inlet bore 11, either end of which may be closed by a pipe plug 12 and the other end connected by a line 13 to the vacuum source A aforesaid. As here shown my valve also includes a series or bank of five separate circuit controls (the number may, of course, vary according to requirements) and for each said bank the body member 10 is provided with a pair of transversely extending upper and lower cross bores 14 and 15 the opposite ends of which are closed by gaskets 16 and side plates 17 secured by cap screws 18 to the sides of the body member. These cross bores may also be referred to herein as the first series of cross bores 15 and the second series 14. Downwardly opening inlet and outlet ports 19 and 20 are formed in the body member 10, a pair for each valve bank, and at their lower ends these ports are tapped for lines 21 and 22 leading to opposite ends of each control cylinder B. These ports 19 and 20 are located adjacent the opposite sides of the body member 10 and both traverse and communicate with the upper and lower bores 14 and 15, as best seen in Fig. 1.

Figure 2:
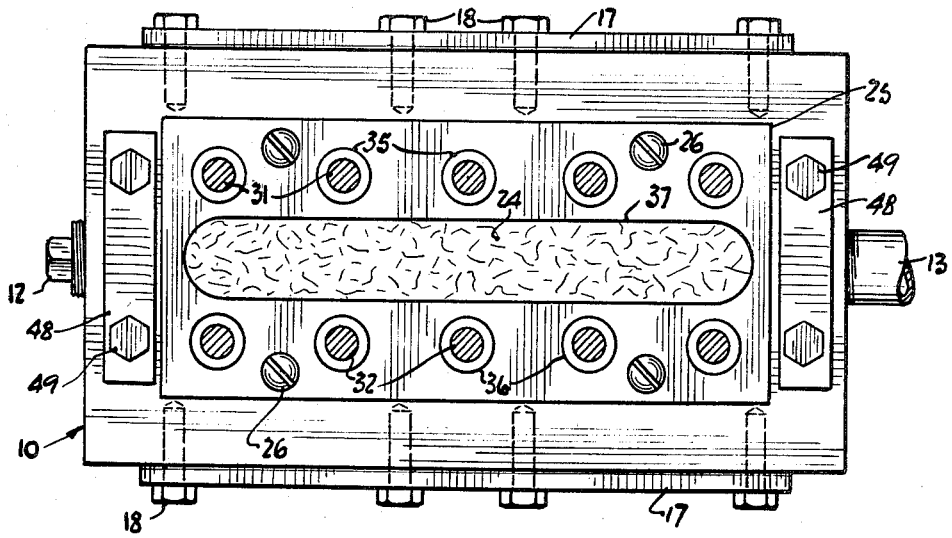
Fig. 2 is a horizontal sectional view taken substantially along the line 2—2 in Fig. 1.
Figure 3:
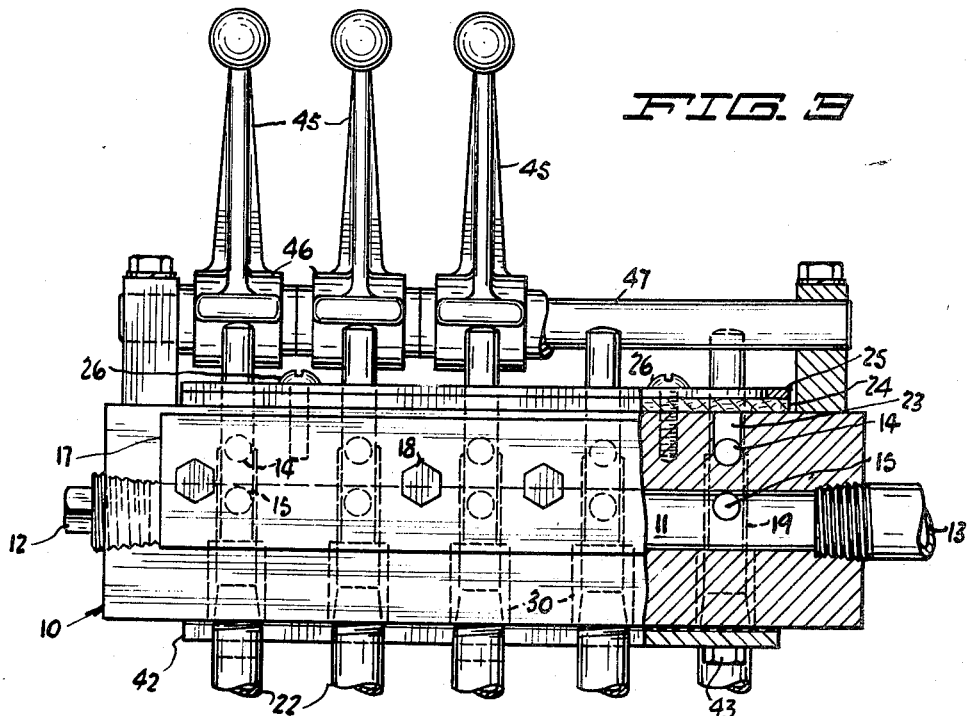
Fig. 3 is a side elevation of the control valve of my invention, partially in longitudinal section.

Centrally the upper cross bores 14 communicate through openings 23, in the upper side of the body member 10, with the atmosphere and these openings 23 are covered with a baffle or pad 24 of felt or other porous or air pervious material, which is held in place by a cover plate 25 secured to the body member by cap screws 26 tapped thereinto. This felt pad 24 excludes dirt and other foreign material from the interior of the valve, without preventing the free passage of air. The body member 10 also has, in line with each of the cross bores 14 and 15, a pair of valve bores 27—28 which are located at right angles to and intersect said cross bores. As the valve is here shown the valve bores 27—28 open upwardly through the top of the body member 10 while at their lower ends they are enlarged to form spring chambers 29—30. Of course, the valve may be used in any position and the upper and lower designations here used are for convenience only. Located in each set of valve bores is a pair of reciprocating valve plungers 31—32 which extend upwardly in wiping relation through openings 33—34 formed in the pad 24 and loosely through openings 35—36 in the cover plate 25. As will be seen in Fig. 2 the latter has an elongated slot 37 exposing the pad 24 when it traverses all of the aforesaid openings 23 to permit passage of air through said openings. The wiping relationship between the pad and upper end portions of the valve plungers 31—32 serves to keep them clean and also as the only seals required.

The lower ends of the valve plungers 31—32 enter the chambers 29—30 aforesaid and are reduced at 38 to engage washers 39 which bear against the upper ends of expansion coil springs 40—41 located in the respective chambers and which bias the valve plungers upward to their normal positions shown in Fig. 1. The valve springs 40—41 are held in place by a bottom plate 42 held on the underside of the body member 10 by cap screws 43 and provided with a sealing gasket 44.

Each pair of valve plungers 31—32 are individually actuated by control levers designated throughout at 45 having lower hubs 46 by which they are rockably mounted on a shaft 47 extending lengthwise above the body member and held in place by bearing blocks 48 secured by cap screws 49. Each control lever 45 has oppositely projecting lugs 50—51 overlying the upper ends of the valve plungers 31—32 and normally the levers are centered (Fig. 1) by action of the valve springs 40—41. Movement of any control lever 45 to one side or the other will, however, cause its lug 50 or 51 to force one of the valve plungers downward and this action moves diametrically reduced portions 52 or 53 on the plungers from their normal alignment with the upper cross bore 14 down into registry with the lower cross bore 15, compressing one of the springs 40 or 41 in the process.

Normally each pair of the lines 21 and 22 communicate through the bores 19 and 20 and upper cross bore 14 with the atmosphere through the opening 23 and felt pad 24, the reduced portions 52 and 53 of the valve plungers 31—32 permitting this but, as an example, if the plunger 31 is pushed down by moving its control lever 45 to the dotted line position 45a of Fig. 1, then its reduced portion 52 will connect the line 21 to the intake bore 11 through the lower bore 15. The device A will then pull a vacuum in the connected end (left as viewed in Fig. 1) of the control cylinder B, the piston rod C will be projected and the valve F adjusted to one condition. Reverse movement of the control lever 45 will reverse this condition, as will be apparent. It will thus be possible, by the provision of a simple vacuum source and suitable connecting lines or conduits to control a number of positive pressure circuits including valves and the rams controlled thereby, the control being not only simple and effective but permitting finger tip actuation from any remote point, as for example in the cab of a truck carrying a grader the blade of which is positioned by the rams. The valve block or body member 10 may be set up to control any required number of circuits and where it provides for more than the required number of valves then some of the control levers 45 and associated valve plungers may be omitted, of course.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. For controlling a plurality of valves from a vacuum source and including a plurality of vacuum operated actuating cylinders for such valves, a control valve having a body member, said body member having an inlet bore and means connecting the same to said vacuum source, the body having a plurality of upper and lower cross bores, the lower ones of which communicate with said inlet bore, the upper cross bores communicating with the atmosphere, said body having a plurality of pairs of inlet and outlet ports communicating with said cross bores and means connecting the inlet and outlet ports to said actuating cylinders, valve means operative to selectively connect any of said cylinders to the vacuum source and to atmosphere, and means including an air pervious pad connecting all of said upper cross bores to atmosphere, said valve means including reciprocating valve plungers slidable in wiping relation through said pad.

2. For controlling a plurality of valves from a vacuum source and including a plurality of vacuum operated actuating cylinders for such valves, a control valve having a body member, said body member having an inlet bore and means connecting the same to said vacuum source, the body having a plurality of pairs of cross bores one of each of which communicates with said inlet bore, the remaining cross bores communicating with the atmosphere, said body having a plurality of pairs of inlet and outlet ports communicating with said cross bores and means connecting the inlet and outlet ports to said actuating cylinders, said body member also having a plurality of pairs of valve bores communicating with the cross bores, valve plungers slidably and reciprocatably mounted in said valve bores and projecting from said body member, control levers and means rockably and independently supporting the levers on the body member, said plungers having reduced portions normally registering with the cross bores which communicate with the atmosphere, said levers having oppositely projecting lug elements engaging the ends of the valve plungers for moving any of the same to bring their reduced portions into registry with the cross bores communicating with the inlet ports, a felt pad between the cross bores and atmosphere, and said valve plungers projecting in wiping relation through the pad into engagement with the lug elements on said levers.

3. For controlling a plurality of valves from a vacuum source and including a plurality of vacuum operated actuating cylinders for such valves, a control valve having a body, said body having an inlet bore and means connecting the same to said vacuum source, the body having a first series of cross bores all communicating with the inlet bore and a second series of cross bores spaced from the first and all of said cross bores extending crosswise in the body with respect to said inlet bore, the said body also having a series of inlet ports connecting corresponding ends of the first and second series of cross bores and a series of outlet ports connecting the opposite ends of the cross bores, means for connecting the inlet and outlet ports to said actuating cylinders, means including an air pervious pad element connecting the second series of cross bores to atmosphere, and valve means operative in the body to selectively connect the cylinders to the vacuum source and the atmosphere.

4. For controlling a plurality of valves from a vacuum source and including a plurality of vacuum operated actuating cylinders for such valves, a control valve having a body, said body having an inlet bore and means connecting the same to said vacuum source, the body having a first series of cross bores all communicating between their ends with the inlet bore and a second series of cross bores, means including an air pervious pad forming a connection between the second series of cross bores and the atmosphere, the body having a series of inlet ports connecting the first and second series of cross bores at one side of the inlet bore and a series of outlet ports connecting the first and second series of cross bores at the opposite side of the inlet bore, and the valve body having an elongated opening parallel with the inlet bore connecting the said pad with all bores of the said second series of cross bores intermediate said inlet and outlet ports, means connecting the inlet and outlet ports to the said cylinder, and a series of valve means operative to selectively connect the cylinders through said ports and bores to the vacuum source and to atmosphere.

5. For controlling a plurality of valves from a vacuum source and including a plurality of vacuum operated actuating cylinder for such valves, a control valve having a body, said body having an inlet bore and means connecting the same to said vacuum source, the body having a first series of cross bores all communicating between their ends with the inlet bore and a second series of cross bores, means including an air pervious pad forming a connection between the second series of cross bores and the atmosphere, the body having a series of inlet ports connecting the first and second series of cross bores at one side of the inlet bore and a series of outlet ports connecting the first and second series of cross bores at the opposite side of the inlet bore, and the valve body having an elongated opening parallel with the inlet bore connecting the said pad with all bores of the said second series of cross bores intermediate said inlet and outlet ports, means connecting the inlet and outlet ports to the said cylinder, and a series of valve means operative to selectively connect the cylinders through said ports and bores to the vacuum source and to atmosphere, the said valve means including valve plungers slidable across said cross bores and slidable through the said pad, and operating means on the body for said valve plungers.

References Cited in the file of this patent

UNITED STATES PATENTS

| | | |
|---|---|---|
| 2,340,454 | Conde | Feb. 1, 1944 |
| 2,351,732 | Almond et al. | June 20, 1944 |
| 2,462,544 | Parker | Feb. 22, 1949 |
| 2,475,298 | Sloane | July 5, 1949 |
| 2,501,328 | Gurries | Mar. 21, 1950 |
| 2,650,455 | Jacobsson et al. | Sept. 1, 1953 |
| 2,766,572 | Vogelaar | Oct. 16, 1956 |
| 2,804,883 | Curlett | Sept. 3, 1957 |

FOREIGN PATENTS

| | | |
|---|---|---|
| 107,544 | Australia | May 24, 1939 |
| 1,101,927 | France | Apr. 27, 1955 |